United States Patent [19]
Long et al.

[11] Patent Number: 5,172,388
[45] Date of Patent: Dec. 15, 1992

[54] METHOD AND APPARATUS FOR AN INCREASED PULSE REPETITION RATE FOR A CW PUMPED LASER

[75] Inventors: David C. Long, Wappingers Falls; Howard A. Bender, Fishkill; William D. Carbaugh, Jr., Marlboro; Mark J. La Plante, Walden; Christopher D. Setzer, Wappingers Falls, all of N.Y.

[73] Assignee: International Business Machines Corporation, Armonk, N.Y.

[21] Appl. No.: 734,499

[22] Filed: Jul. 23, 1991

[51] Int. Cl.[5] .............................................. H01S 3/091
[52] U.S. Cl. ...................................... 372/70; 372/10; 372/25; 372/75
[58] Field of Search .................. 372/10, 14, 15, 30, 372/25, 69, 70, 92, 108, 72, 68, 75

[56] References Cited

U.S. PATENT DOCUMENTS

| | | | |
|---|---|---|---|
| 3,238,470 | 3/1966 | Mooney | 372/72 |
| 3,311,844 | 3/1967 | DiCurcio | 331/94.5 |
| 3,423,692 | 1/1969 | Young | 331/94.5 |
| 3,654,568 | 4/1972 | Schimitschek | 372/72 |
| 3,699,474 | 10/1972 | Landry | 372/14 |
| 3,914,710 | 10/1975 | Young | 331/94.5 |
| 4,140,979 | 2/1979 | Ramer | 372/72 |
| 4,313,092 | 1/1982 | Kaule | 372/70 |
| 4,555,786 | 11/1985 | Byer | 372/34 |
| 4,567,597 | 1/1986 | Mandella | 372/34 |
| 4,575,854 | 3/1986 | Martin | 372/75 |
| 4,751,706 | 6/1988 | Rohde et al. | 372/14 |
| 4,845,721 | 7/1989 | Hoffmann | 372/34 |
| 4,890,289 | 12/1989 | Basu et al. | 372/33 |
| 4,912,720 | 3/1990 | Springsteen | 372/72 |
| 4,993,038 | 2/1991 | Nakano et al. | 372/72 |

FOREIGN PATENT DOCUMENTS

| | | | |
|---|---|---|---|
| 2932204 | 2/1981 | Fed. Rep. of Germany | 372/72 X |
| 61-20381 | 1/1986 | Japan | 372/70 X |
| 2-67783 | 3/1990 | Japan | 372/70 X |

*Primary Examiner*—Brian Healy
*Attorney, Agent, or Firm*—Aziz M. Ahsan

[57] ABSTRACT

A solid state lasing rod is spun on its long axis. The rod is pumped with photons while it spins. The rod is greater in diameter than the aperture. The rod is aligned off-center from the center of the aperture so that different portions of the rod are exposed to the aperture for lasing. The repetition rate of the lasing of the laser is increased because as the rod spins, the area of the rod that is not lasing is being charged. The laser rod can also be hollow to allow for pumping of the photons from either outside or inside the hollow bore or both. Similarly, this hollow bore in the laser rod could also allow cooling fluids to be circulated therethrough.

52 Claims, 6 Drawing Sheets

METHOD AND APPARATUS FOR AN INCREASED PULSE REPETITION RATE FOR A CW PUMPED LASER

FIELD OF THE INVENTION

This invention relates generally to method and apparatus for an increased pulse repetition rate for a CW (Continuous Wave) pumped Q-switched laser, and more specifically to method and apparatus for an increased pulse repetition rate of CW pumped Q-switched Nd:YAG laser using a spinning rod. Also disclosed are methods and apparatus for cooling the lasing rod. The invention also teaches that hollow laser rods can be used to provide the increased pulse repetition rate for a CW pumped laser.

BACKGROUND OF THE INVENTION

Various methods and apparatus have been used to efficiently pump lasers and to get the maximum output from the laser pumping medias. For example, U.S. Pat. No. 3,311,844 (DiCurcio) disclosed a "high-speed" pulsed laser system. It uses multiple rods that are secured to the periphery of a wheel. The rods are rotated into a laser cavity and pulsed pumped and fired. However, "high-speed" for this system is 1 Hz with very high power. Also embodied in this patent is cooling of the rods by a method of selective indexing. This system also shows that multiple pumping lamps can be used to pulse pump these one or more rods in the pumping chamber. These lamps are flashed in coordination with the passage of the rods through the pumping chamber to deliver pumping energy to the rod in the chamber. In this manner the lamps are fired sequentially to avoid excessive heat build-up in any one lamp. If it is desired to cool each laser rod after the rod has been pulsed, one or more cooling devices such as fans or blowers can be placed around the periphery of the system to deliver a flow of cooling air to cool the laser rods after they have been pulsed.

U.S. Pat. No. 4,555,786 (Byer) discloses another high power solid state laser. It describes a laser system where the motion of the laser medium is solely for the purpose of thermal load distribution. Reference is made to a spinning glass disk or slab. The purpose of moving the lasing medium is to reduce thermal stress in the glass disk or slab to keep it from breaking. This patent also shows that the lasing slab or disk can be cooled by using a film of an index matching fluid. This film is applied on the surface of the rotating lasing disk to transfer the heat from the rotating disk or slab to a cooling sheet or plate.

U.S. Pat. No. 4,567,597 (Mandella) discloses a laser system having a stationary lasing region. The lasing medium is rotated to bring thermally cooled unpumped portions into the lasing cavity and where it is pumped and then allowed to lase, and the lasing media is then rotated out of the lasing cavity so that heat is transferred out of the cylinder to the surroundings. This patent also discloses a laser rod in the shape of a hollow cylinder that is rotated so that the cooled and non-excited region is brought into the resonator cavity, is allowed to lase, the then fired portion of the hollow laser rod is rotated out so that heat is transferred out of the hollow cylinder to the surroundings.

U.S. Pat. No. 4,575,854 (Martin) discloses another unique pumping scheme for Nd:YAG lasers. Instead of using an arc lamp, a bank of laser diode arrays or an array of laser diodes surrounds the cylindrical rod. These laser diode arrays are sequentially pulsed to provide CW pumping, by insuring that at least one diode array is on while the others are off. Each diode array actually operates at quite a low duty-cycle for cooling purposes. The stationary Nd:YAG laser rod is pumped by the surrounding array of diode laser bars, which are electronically fired in rotation.

U.S. Pat. No. 4,845,721 (Hoffmann) discloses a solid state laser rod having internal bores through which a coolant can flow. Hoffmann also discloses rotating the rod so that only specific portions of the laser materials are subjected to pumping while other portions are cooling. This patent also describes means by which solid-state laser media can be cooled through special designs/shapes of the actual material. These designs facilitate laser cooling by increasing surface area for heat extraction. Reference is made to a tubular shaped rod (empty cylinder) which is rotated into the resonator pumping region, however, this is done solely for cooling purposes.

U.S. Pat. No. 4,890,289 (Basu et al.) discloses a rotating disk laser which is optically pumped by a source positioned off center from the axis of rotation of the lasing disk. This patent describes both rotation or translation of the lasing medium for the purpose of thermal load distribution. Reducing the thermal effects caused by lamp pumping is the main purpose of this patent. It incorporates diode-pumping with delivery of that radiation via fiber optics Additionally, the rotation of the medium is solely for the purpose of reducing thermal stress in the medium.

This invention, however, discloses a solid state lasing rod that is spun at high rates of speed on its long axis The rod is of a size, larger than the size of the aperture through which the lasing beam passes. While the rod is spun, within a mirrored cavity, the rod is pumped with photons Because the laser rod is larger than the aperture, the laser beam to be used for processing can be off-centered from the rod axis. The beam of light through this off-axis aperture is then amplified by the rod and transmitted through the end mirrors and then is directed to the work-piece.

The spinning rod increases the laser repetition rate, because as the rod spins, the area of the rod that is not releasing photons or not lasing is being charged or pumped with photons, so that each area that lases is fully charged when it is rotated to lase through the aperture.

A hollow solid state lasing rod can also be used with this invention. In such a case, the hollow lasing rod is pumped with photons from inside, and/or outside. The hollow rod can be spun using off-axis apertures and still get results which are similar to the ones obtained using a solid state lasing rod.

The hollow lasing rod could also be cooled from the inside using water or other fluids. Other liquids or gas medium, e.g. liquid nitrogen or freon, can also be used to cool the hollow or the solid state lasing rod from the outside.

This invention also discloses that fluid or water bearings can be used when either the solid or hollow solid state laser rod is being spun. In such a case, the fluid is not only used to cool the bearing surfaces of the solid state laser rod but also acts as a lubricant.

OBJECTS AND SUMMARY OF THE INVENTION

An object of this invention is to provide an increased pulse repetition rate for CW pumped Q-Switched lasers using spinning solid state laser rods.

Another object of this invention is to provide larger diameter solid state laser rods for proportionally higher repetition rates or lower rotational speeds.

Still another object of this invention is to utilize the entire volume of the laser medium while maintaining a gaussian beam profile.

Yet another object of this invention is to achieve greater CW laser output with a gaussian beam profile.

Still another object of this invention is to extract the maximum lasing output from the solid state laser rod.

Yet another object of this invention is to provide means for cooling the solid state lasing rod.

Another object of this invention is to provide pressurized fluid bearings, thereby eliminating oil contamination inside the laser cavity.

In one aspect this invention is a CW pumped laser comprising:
- a) a laser rod for forming a laser beam, wherein the laser rod has an axis of rotation and a laser beam optical axis, wherein the optical axis is set-off from the axis of rotation by at least one laser beam radius,
- b) at least one means for optically pumping at least a portion of the laser rod,
- c) at least one means for rotating the laser rod,
- d) at least one first mirror to reflect at least a portion of the laser beam,
- e) at least one second mirror, wherein the second mirror is an output coupler mirror to reflect at least a portion of the laser beam, wherein the second mirror is opposite the first mirror,
- f) at least one aperture defining the diameter of the laser beam, and
- g) wherein the optical axis passes through the aperture and the first and the second mirrors during the rotation of the laser rod, thereby forming the CW pumped laser.

In another aspect this invention is a CW pumped laser comprising:
- a) a laser rod wherein at least a portion of the laser rod is hollow, and wherein at least a non-hollow portion of the hollow laser rod forms a laser beam, the hollow laser rod has an axis of rotation and a laser beam optical axis, wherein the optical axis is set-off from the axis of rotation by at least one laser beam radius,
- b) at least one means for optically pumping at least a portion of the hollow laser rod,
- c) at least one means for rotating the hollow laser rod,
- d) at least one first mirror to reflect at least a portion of the laser beam,
- e) at least one second mirror, wherein the second mirror is an output coupler mirror to reflect at least a portion of the laser beam, wherein the second mirror is opposite the first mirror,
- f) at least one aperture defining the diameter of the laser beam, and
- g) wherein the optical axis passes through the aperture and the first and the second mirrors during the rotation of the hollow laser rod, thereby forming the CW pumped laser.

In still another aspect this invention is a method for an increased pulse repetition rate for a CW pumped laser comprising the steps of:
- a) rotating a laser rod having an optical axis and a rotational axis, wherein the optical axis is displaced from the rotational axis by at least one radius of a laser beam,
- b) optically pumping at least a portion of the rotating laser rod, such that at least a portion of the rotating laser rod is lasing and forming the laser beam, while at least a portion of a non-lasing portion of the rotating laser rod is being optically pumped,
- c) at least two mirrors reflecting at least a portion of the laser beam, wherein at least one of the mirrors is an output coupler mirror, and
- d) allowing the passage of the reflected laser beam to pass through at least one exit aperture, and thereby increasing the pulse repetition rate for the CW pumped laser.

In yet another aspect, this invention is a method for an increase pulse repetition rate for a CW pumped laser comprising the steps of:
- a) rotating a laser rod, wherein at least a portion of the laser rod is hollow, the laser rod having an optical axis and a rotational axis, wherein the optical axis is displaced from the rotational axis by at least one radius of a laser beam,
- b) optically pumping at least a portion of the rotating hollow laser rod, such that at least a portion of the rotating hollow laser rod is lasing and forming the laser beam, while at least a portion of a non-lasing portion of the rotating laser rod is being optically pumped,
- c) at least two mirrors reflecting at least a portion of the laser beam, wherein at least one of the mirrors is an output coupler mirror, and
- d) allowing the passage of the reflected laser beam to pass through at least one exit aperture, and thereby increasing the pulse repetition rate for the CW pumped laser.

These and other objects and aspects of the invention will become more apparent after referring to the following description considered in conjunction with the accompanying drawings.

BRIEF DESCRIPTION OF THE DRAWINGS

The features of the invention believed to be novel and the elements characteristic of the invention are set forth with particularity in the appended claims. The figures are for illustration purposes only and are not drawn to scale. Furthermore, like numerals refer to like features in the drawings even though these features may not necessarily have been drawn to scale. The invention itself, however, both as to organization and method of operation, may best be understood by reference to the detailed description which follows, taken in conjunction with the accompanying drawings in which:

DETAILED DESCRIPTION OF THE INVENTION

Figure 1:
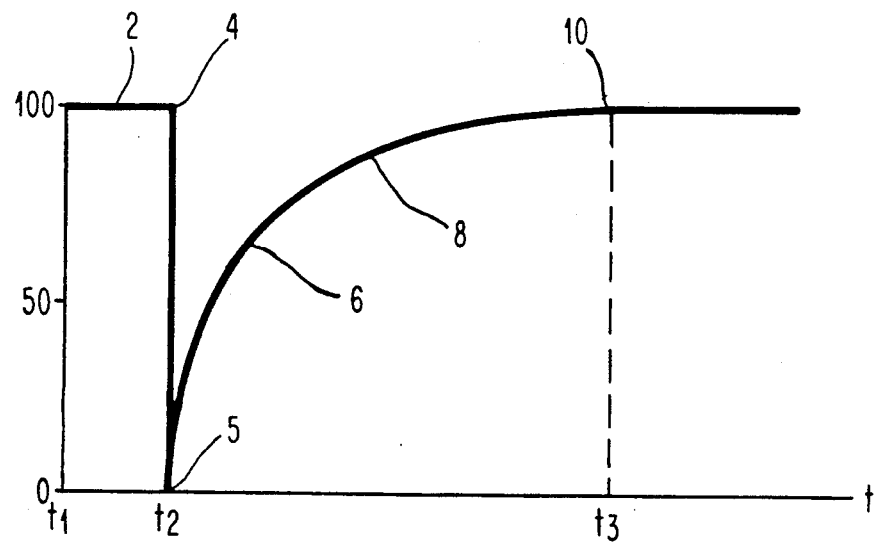
FIG. 1, is a diagram showing a charge and discharge time for a solid state lasing rod of this invention.

In an effort to improve the performance of a CW (Continuous Wave) pumped Q-switched Nd:YAG laser, it has become apparent that the maximum repetition rate at maximum peak power occurs at approximately 1 Khz. This is primarily due to the fixed maximum pumping rate of a CW pumped laser rod as shown in FIG. 1, wherein the X-axis shows the pumping time t, and the Y-axis shows the pumping of the laser rod from zero to 100 percent pumping level.

For existing continuously pumped Q-switched solid state lasers, at time $t_1$, prior to the laser pulse at time $t_2$, the laser rod is fully pumped 2, and is at maximum population inversion. At point 4, the laser is fired, depleting the solid state laser rod of the stored energy at 5, at time $t_2$. With constant pumping at a maximum rate, the population inversion is partially restored at point 8, on the pumping curve 6, and is fully pumped 10, at time $t_3$, which is typically 1 millisecond (msec) for a Nd:YAG laser.

In a standard laser system, if the laser is fired before the laser rod has had time to be fully repumped, then the resulting output pulse of light is less intense than that of a pulse from a fully pumped laser rod. This leads to large variations in output energy for randomly pulsed laser rods, and is very undesirable for most laser applications.

Figure 2A:
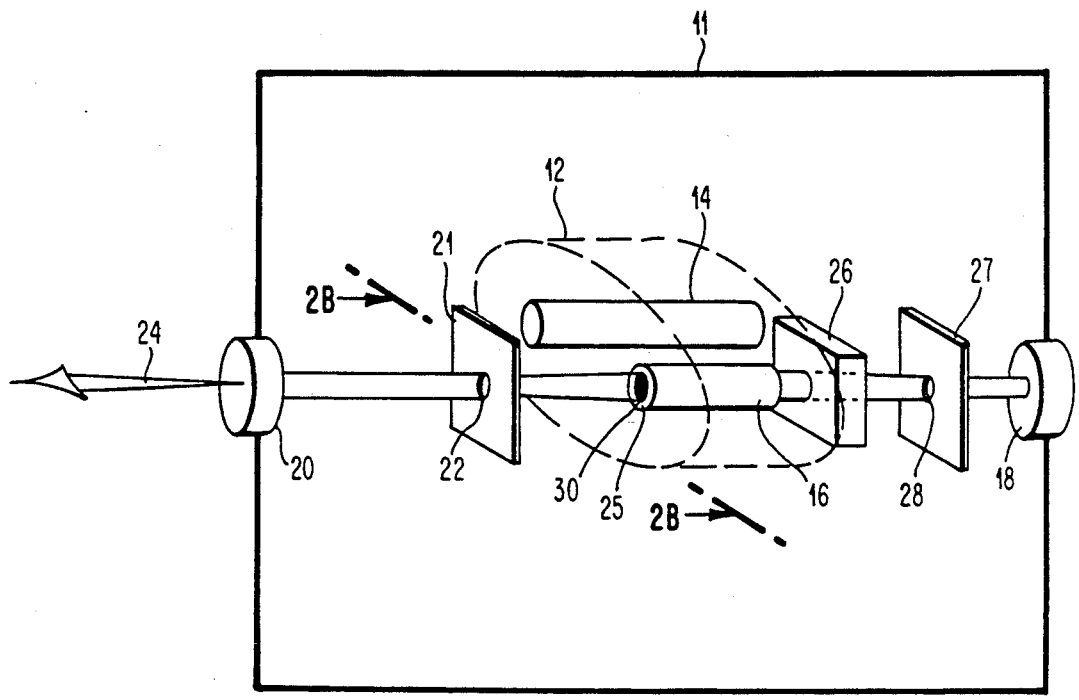
FIG. 2A, illustrates the prior art apparatus and method for lasing a solid state lasing rod in a CW pumped Q-switched laser cavity.
Figure 2B:
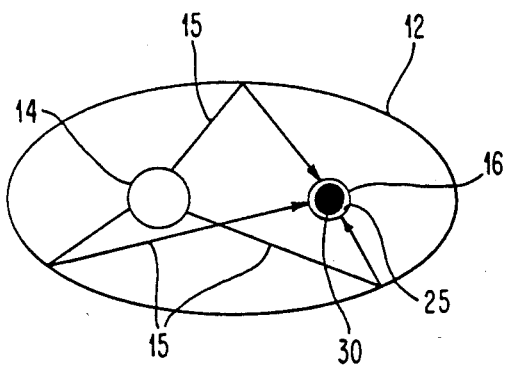
FIG. 2B, is a schematic view taken along section 2B—2B in FIG. 2A.

A typical prior art solid state Nd:YAG laser cavity 11, is shown in FIGS. 2A and 2B. A reflector 12, which is typically a liquid-cooled elliptical reflector, houses both the optical pumping source 14, such as a CW krypton arc lamp, and the solid state laser rod 16. The first or rear mirror 18, which could also be an output coupler mirror, and the second or front mirror 20, which is an output coupler mirror 20, form a laser resonator or optical cavity 11. The position of the mirrors 18 and 20, could be easily interchanged, depending on which side one wants the laser beam 24, to exit through the exit aperture. The front aperture 22, in a front plate 21, and the rear aperture 28, in the rear plate 27, provide spatial filtering to define the allowable beam path to produce a gaussian output beam 24. A Q-switch 26, essentially gates the beam on and off allowing an output laser pulse to occur when desired.

FIG. 2B, is a sectional view taken along section 2B—2B, in FIG. 2A, showing the reflector 12, with laser rod 16. The krypton arc lamp 14, emits pumping radiation or light rays or photons 15, inside the elliptical reflector 12. These light rays 15, pump the laser rod 16. Upon being sufficiently charged the laser rod 16, emits photons towards the rear mirror 18. The Q-switch 26, which is under electronic control, controls the passage of the laser beam, and upon command, allows the photons to strike the rear mirror 18. After these photons bounce back to the laser rod 16, they are amplified by stimulated emission producing a laser beam 24, which exits through the front aperture 22, and the output coupler mirror 20. Typically, the output coupler mirror 20, only allows about 10 percent of the laser beam 24, to pass through, and it reflects the remaining light back into the laser cavity 11, for further amplification by stimulated emission of photons. The apertures 22 and 28, can be used to define the allowable laser beam diameter. This controlling of the laser beam diameter by the apertures create the active or lasing region 30, and inactive or non-lasing region 25, in the laser rod 16. These apertures 22 and 28, are utilized to insure that the laser produces a gaussian beam which can be finely focused. In cases where these apertures 22 and 28, are not used, the emitted laser beam may be multimode which cannot be finely focused. The use of the apertures 22 and 28, to achieve a high quality beam will result in a lower power output due to the fact that a smaller portion of the laser rod 16, is allowed to lase.

The above configuration produces a stable gaussian mode of limited repetition rate and most efficiently utilizes the pumped volume of the laser rod 16. The same gaussian beam 24, may, however, be obtained by using a larger diameter rod (normally used in high power multi-mode lasers) with the same apertures, but at a reduced efficiency, this is due to the unused volume of the pumped rod.

In standard Nd:YAG laser configurations, to produce a gaussian beam profile 24, as discussed above, a small diameter solid state laser rod 16, in an elliptical pumping chamber 12, is used along with apertures 22 and 28, to define the gaussian mode and beam path through the laser rod 16.

Figure 3A:
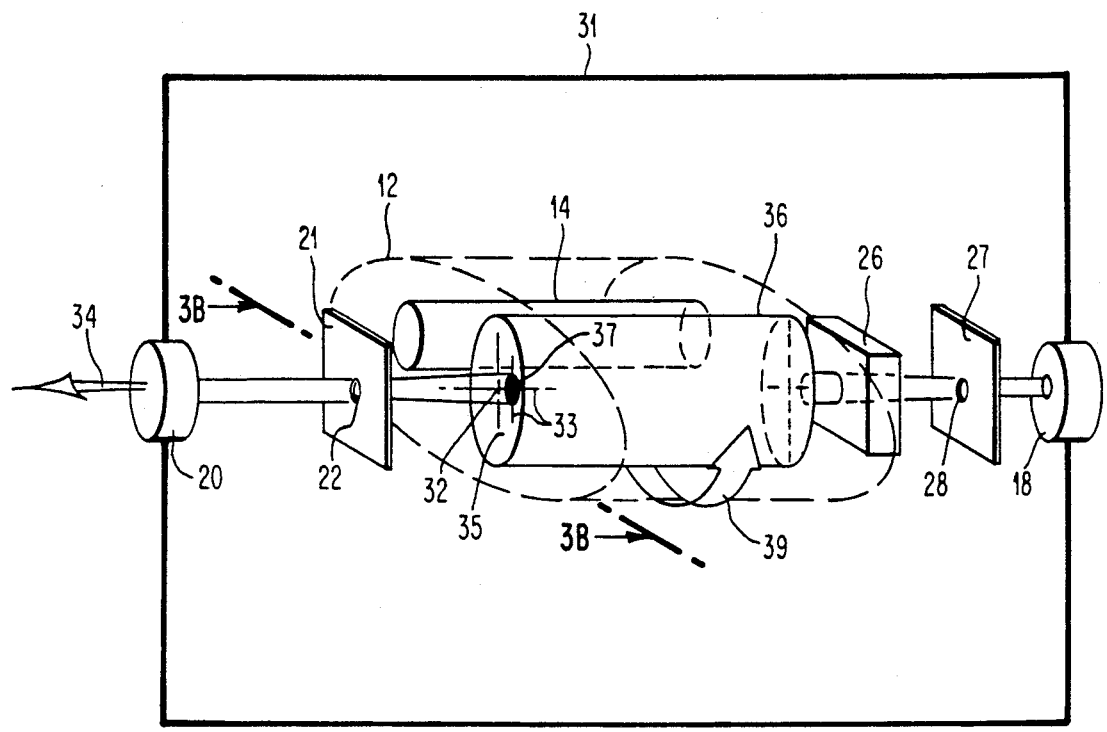
FIG. 3A, illustrates one embodiment of this invention, showing the spinning laser rod with off-set apertures.
Figure 3B:
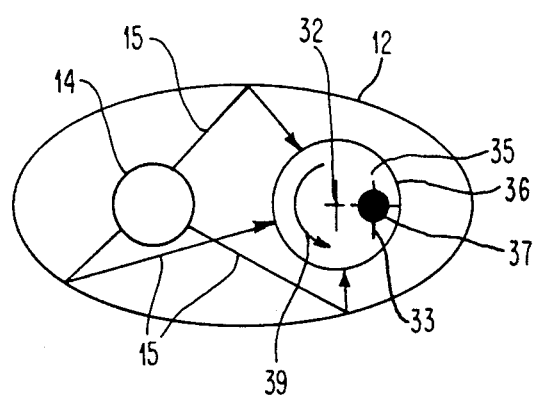
FIG. 3B, is a schematic view taken along section 3B—3B, in FIG. 3A.

FIGS. 3A and 3B, illustrate one embodiment of this invention. A schematic view taken along section 3B—3B, in FIG. 3A, is illustrated in FIG. 3B. The solid state laser rod 36, has its axis of rotation 32, away from the optical axis 33. The laser cavity 31, is similar to the laser cavity 11, as discussed and described in FIG. 2A, except that the solid state laser rod 36, is caused or made to spin on its long axis at high speeds. Additionally, the axis of rotation 32, of the laser rod 36, should be off-set by at least one radius of the active region 37, from the optical axis 33. The solid state laser rod 36, can be optically pumped by a variety of means such as one or more laser diodes or one or more arc lamps. The reflector 12, is shown to be elliptical but it could be round or of some other shape. As discussed earlier the use of apertures 22, and 28, will result in an active or lasing region 37, and an inactive or non-lasing region 35. The direction of rotation 39, is shown as counter clockwise but similar results will be obtained if the laser rod 36, is rotated in a clock-wise or opposite direction. In the preferred embodiment Nd:YAG (Neodymium:Yttrium Aluminum Garnet) is used. Other solid state laser rods that could be used with this invention could be selected from a group comprising, i.e., Ti:Sapphire, Nd:Glass, Nd:YLF (Neodymium:Yttrium Lanthanum Fluoride), to name a few.

With the beam center line 33, offset parallel to and at a distance greater than its radius to the laser rod axis of rotation 32, as described above, the laser rod 36, may now be rotated about its axis of rotation 32. This essentially moves the inactive region 35, which is the unused fully pumped rod volume into the active region 37, to produce the high repetition rate laser beam 34. This allows pumping to occur in the laser rod 36, for the portions that are not in the beam path. This configuration allows greatly increased repetition rate by offsetting the apertures and spinning the laser rod at a very high speed. This method may be applied to all similar solid state lasers to improve their repetition rate and average power.

By removing the Q-switch 26, continuous wave (CW) radiation results at a much higher average output power than for a non-spinning laser rod version.

By making the apertures 22 and 28, larger, low order multimode operation may be obtained in a similar manner as described above.

Figure 4A:
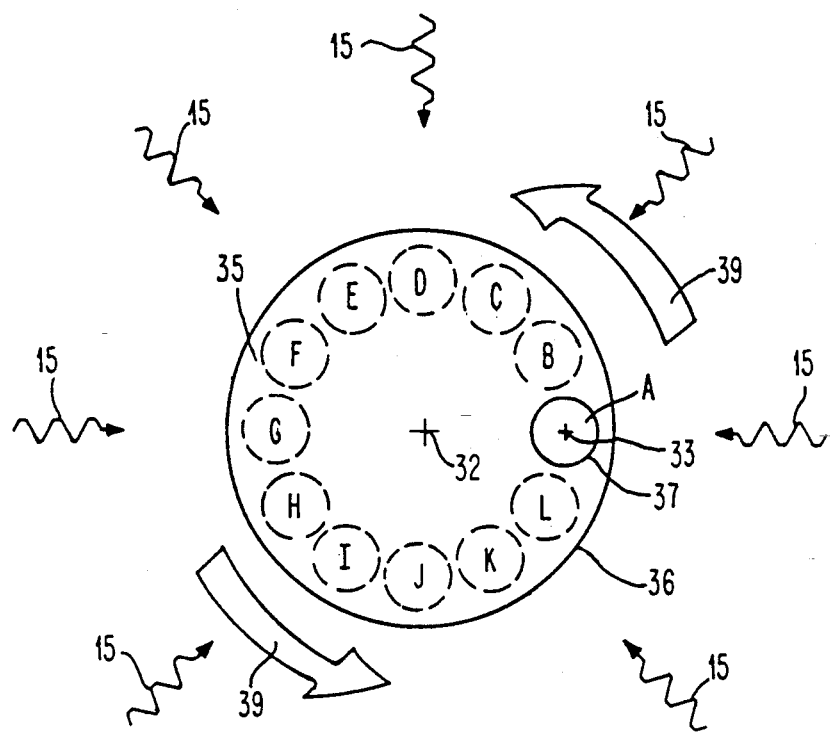
FIG. 4A, shows a process of charging and discharging the solid state solid laser rod of this invention.

FIG. 4A, shows the process of charging and discharging the solid state solid laser rod of this invention. As the laser rod 36, spins, a "new" fully pumped region of the laser rod 36, is placed in line with the cavity/-resonator defined by the offset apertures. The new maximum pulse rate is proportional to the number of aperture sized regions that will fit within the internal circumference of the laser rod 36. If the time it takes to fully repump the laser rod 36, is 1 msec, as shown in FIG. 1, and if the laser rod 36, as shown in FIG. 4A, is caused to complete one revolution in 1 msec, (60,000 RPM), then the depleted (after pulsing) portion of the laser rod 36, would be continuously and completely recharged or pumped during the time for one revolution. This shows a theoretical pulse repetition rate improvement of 12 times. This is calculated by knowing that greater than 12 beam diameters or active regions 37, will fit in the circumference of a laser rod 36, therefore, at 60,000 RPM, the pulse repetition rate would increase to 12 KHz, with the same peak power per pulse. Position A, indicates the active lasing region 37, at a time $t_2$, when the laser rod is fully pumped, fired and thereby fully depleted, as shown by the numeral 5, in FIG. 1. As the laser rod 36, spins continuously at 60,000 RPM, the region A, will be at position B, in one twelfth of a millisecond. At a later time, position A will sweep through positions C, D, through L, acquiring a greater population inversion due to being continuously pumped by an optical pumping source 14. At position L, the population inversion shall be even greater, close to saturation and thereby the region shall be fully pumped and ready to fire again when it is back at position A or the active region 37.

The regions A through L are for purposes of illustration only and are not discrete regions, but are contiguous regions which are being continuously pumped by the pumping radiation 15, until they are fired and depleted. For example, as position A gets fully pumped, fired and depleted in the active region 37, it rotates to position B, allowing almost charged region L, to enter active region 37, to be fully pumped, fired and depleted. This in turn is followed by regions K, J, I, etc., in succession. Therefore, in this example, the laser rod 36, can be fired 12 times per revolution yielding a 12 KHz pulse repetition rate, which is a 12 times improvement over a stationary laser rod. For maximum pulse power, the laser rod 36, is fully pumped before it is fired, which for a typical Nd:YAG laser is 1 msec. Whereas, in this invention the laser has already fired twelve times in 1 msec with the peak powers of each pulse at the same intensity as if it were from a small diameter stationary rod pulsing at 1 pulse per msec. Similarly, a 24 times improvement could be achieved if 24 aperture size regions could be fitted within the internal circumference of the laser rod 36, while maintaining the same rotational speed. For laser rods made from different materials, the rotational speed should be adjusted according to its particular pump or repump or depletion time. Similarly, larger diameter laser rods may require proportionally higher pumping rates.

Larger diameter rods allow for proportionally higher repetition rate or lower rotational speeds. Nd:YAG laser rods are available in larger diameters which would allow even higher repetition rates.

This method for increasing the repetition rate of the Nd:YAG laser is particularly useful when considering its applications in material processing where through-put is a consideration. A twelve-fold increase in laser repetition rate corresponds directly to a twelve-fold increase in tool through-put.

Figure 4B:
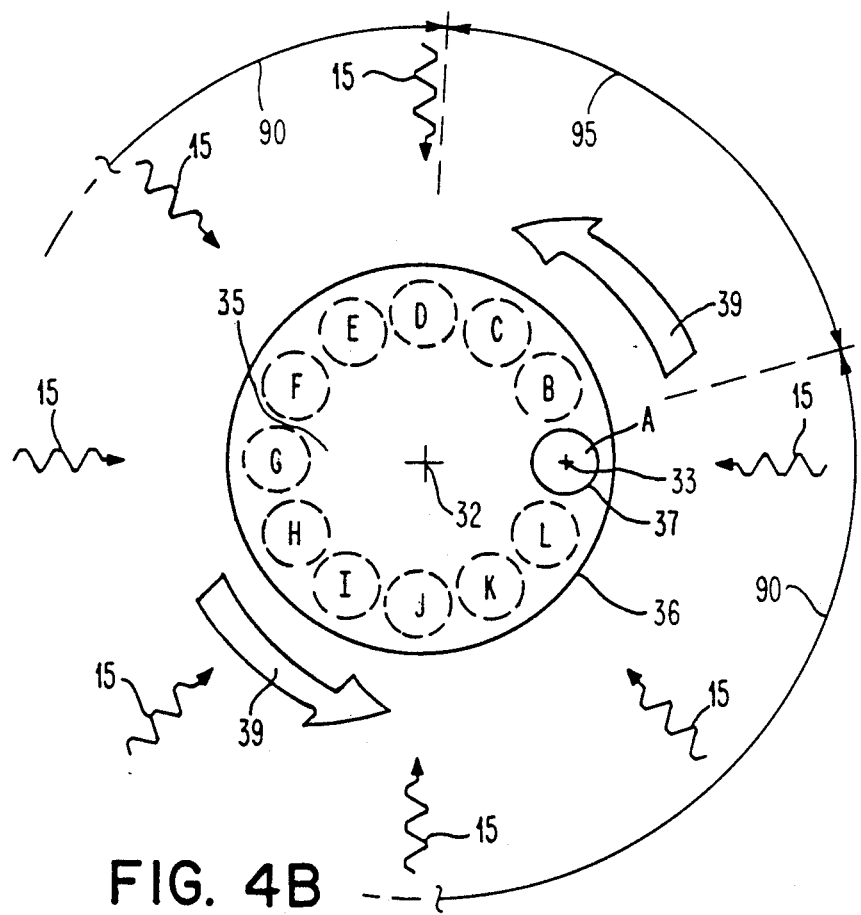
FIG. 4B, shows another process of charging and discharging at least a portion of the solid state solid laser rod of this invention.

FIG. 4B, shows pumping the laser rod 36, over less than the full circumference of the laser rod 36, at point A, the laser rod 36, is fully charged and ready to fire or lase. Region 90, indicates the portion of the spinning laser rod 36, that the pumping radiation 15, is impinging on and charging the laser rod 36. On the other hand region 95, indicates the portion of the spinning laser rod 36, that is not illuminated by the pumping radiation. Therefore, for rods 36 or 76, (shown in FIG. 7) spinning at the optimum rate, or less, or those of differing composition, enhanced performance/increased pumping efficiency may be realized by concentrating the pump illumination to less than the entire circumference. This can be easily achieved through reflection or refraction means or through the use of a plurality of lamps or laser diodes (not shown). By confining the pump illumination to region 90, and adjusting region 90, so that the illumination matches the time it takes to repump the laser rod 36, or similar such laser rod, at the particular rotational speed, the laser system can thereby be optimized.

Figure 5:
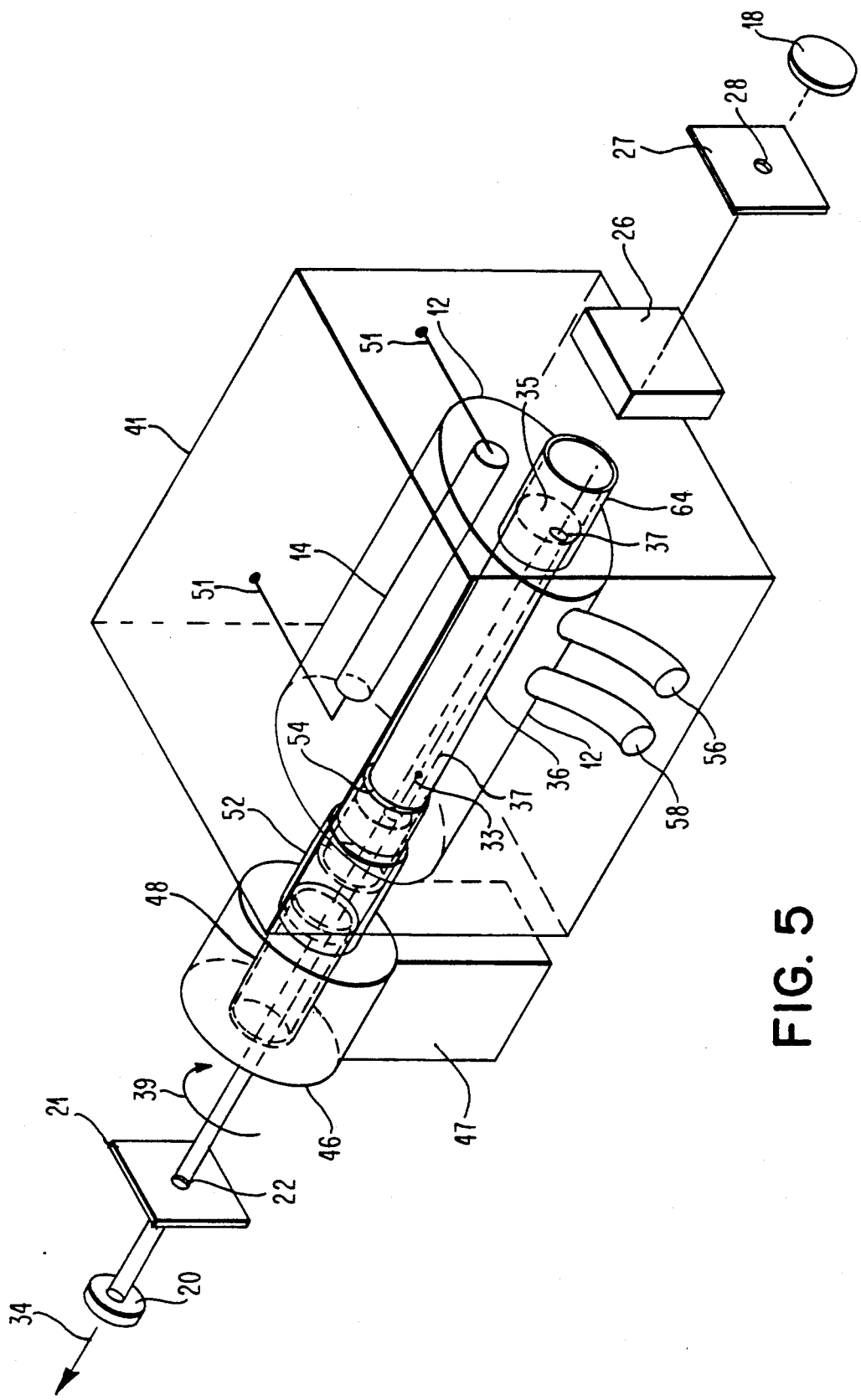
FIG. 5, illustrates the apparatus for the solid state laser rod rotation, showing the preferred embodiment of this invention.

Assembly of the spinning rod system is as shown in FIG. 5. Motor 46, has a hollow rotor 48. Rotor 48, is connected to laser rod 36, via hollow shaft 54, and hollow flexible coupling 52. Alternatively, a high speed motor could be used with a belt and pulley or gears, setup with appropriate ratios to achieve the desired rotational speed. Hollow shaft 54, comprises part of the front bearing assembly.

The motor 46, is held securely in place by a motor support pedestal 47. The hollow rotor 48, that rotates the laser rod 36, is hollow to allow the laser beam 34, to pass through. Similarly, the hollow flexible coupling 52, and hollow shafts 54 and 64, that couples the hollow rotor 48, to the solid state laser rod 36, also have to be hollow, so as not to hinder the passage of the laser beam 34. In some situations, it may be advantageous to couple the hollow rotor 48, directly to the laser rod 36.

During normal operation the laser rod 36, and the arc lamp 14, need to be cooled. This can be achieved in a number of ways. For example, the elliptical reflector 12, that houses the arc lamp 14, and the laser rod 36, could have one or more cooling ports 56 and 58, to allow cooling fluid to enter and exit and cool the arc lamp 14, and the laser rod 36. As shown in FIG. 5, a laser housing assembly 41, provides mounting for the laser rod 36, arc lamp 14, electrical connection 51, for the arc lamp 14, and cooling ports 56 and 58, to cool the assembly. Cooling fluid inlet 56, allows the cooling fluid to enter through the laser housing assembly 41, into the elliptical reflector 12, to cool the laser components in the elliptical reflector 12. This cooling fluid then exits through the cooling fluid outlet 58, into a standard external heat exchanger.

Figure 6A:
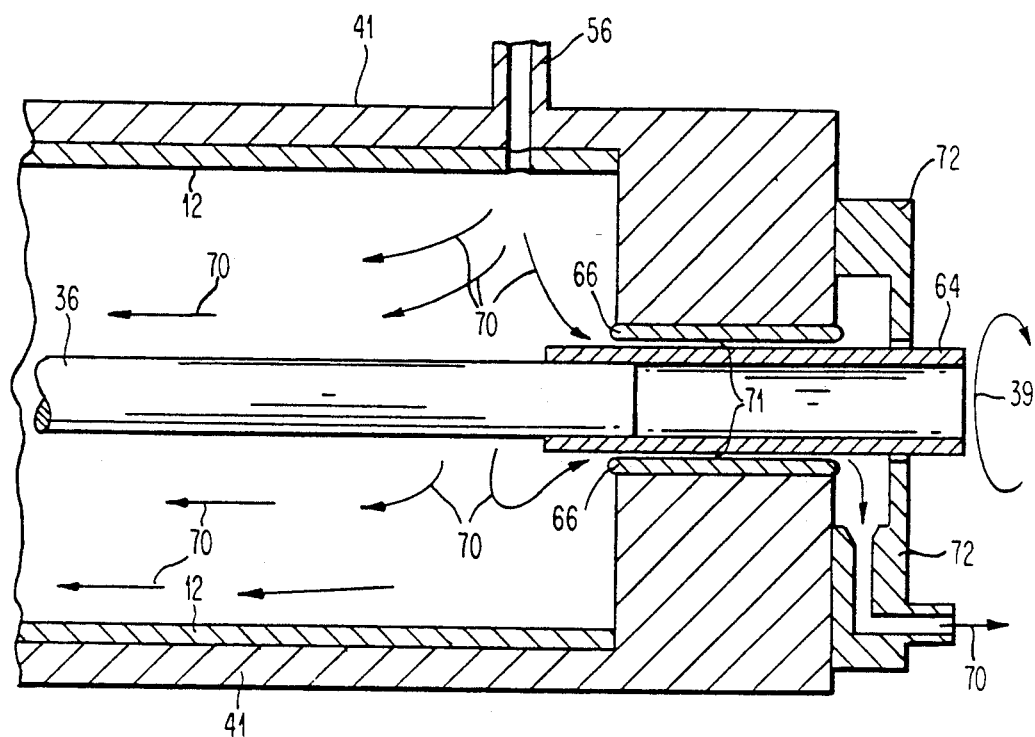
FIG. 6A, shows a cooling and fluid bearing system of this invention.

FIG. 6A, illustrates a high speed liquid bearing system. A CW pumped laser rod 36, is contained in a pressurized fluid filled reflector 12, for cooling both the laser rod 36, and the optical pumping source 14, which in this case is the arc lamp 14. At the rear end, the laser rod 36, is mounted in hollow shaft 64, and placed in the laser housing assembly 41, using the hollow shaft 64, as the rotary bearing surface. While at the front end, as shown in FIG. 5, the laser rod 36, is mounted to the hollow shaft 54, in a similar manner. In some situations it may be advantageous to mount the motor 46, having a hollow rotor 48, to the opposite end of laser rod 36, using the hollow shaft 64. At least one cooling fluid 70, such as water, which is typically pressurized is forced between the bushing 66, and hollow shaft 64, acting as a lubricant and coolant and prevents the hollow shaft 64, and bushing 66, from contacting each other, resulting in a low-wear, low-friction non-contaminating bearing.

Laser housing assembly 41, contains laser rod 36, which is mounted to hollow shaft 64, is caused to rotate in bushing 66, such as a porous bronze bushing, by an external motor 46. The cavity in the elliptical reflector 12, is filled with cooling fluid 70, such as water or other liquids or gas. This at least one cooling fluid 70, is caused to flow through the cavity by a pump connected to high pressure or inlet port 56. The low pressure or outlet port 58, serves as a return to a heat exchanger loop which removes heat picked up in the cavity by the cooling fluid 70.

The high pressure or inlet port 56, pressurizes the cavity and causes a slight flow of fluid 70, through the gap 71, between bushing 66, and hollow shaft 64, creating a film of fluid 70. This film of fluid acts as a low friction interface to keep the hollow shaft 64, and bushing 66, from contacting each other. This results in a low wear non-contaminating bearing. An external drip collection system 72, removes the fluid 70, which passes through the bearing assembly, and returns it to a cooling fluid reservoir.

Figure 6B:
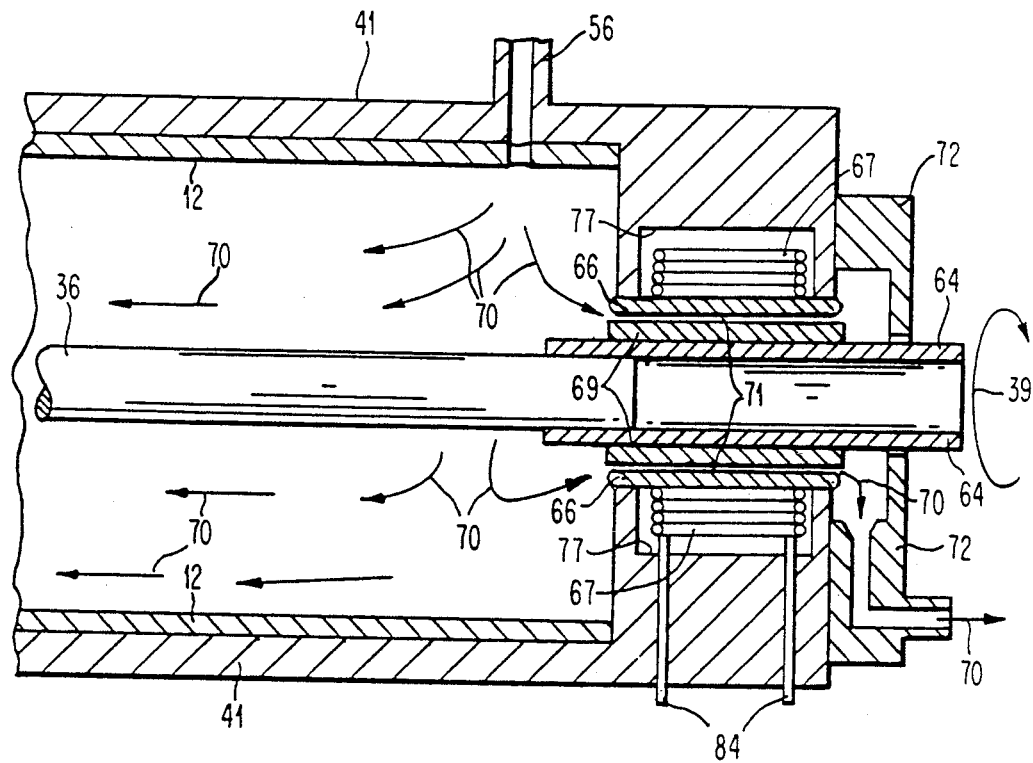
FIG. 6B, shows another cooling and fluid bearing system of this invention.

FIG. 6B, shows another cooling and fluid bearing system of this invention. The laser housing assembly 41, has an opening or cavity 77, at either or both ends of the housing assembly 41, to accommodate motor windings 67. A motor rotor 69, is attached to the hollow shaft 64, and is directly opposite the bushing 66. It is preferred to provide a slight gap 71, between the bushing 66, and the motor rotor 69, to allow the cooling fluid 70, to pass. This limited passage of cooling fluid 70, through this gap 71, not only provides cooling to the motor rotor 69, and bushing 66, but also lubrication. The motor windings 67, have wires 84, to a power source that energizes and forces the rotation or spinning of the motor rotor 69, which in turn spins or rotates the solid state laser rod 36, or similar such laser rod. An advantage of this system is that the spinning means for the laser rod 36, are provided direct and in-line.

Figure 7:
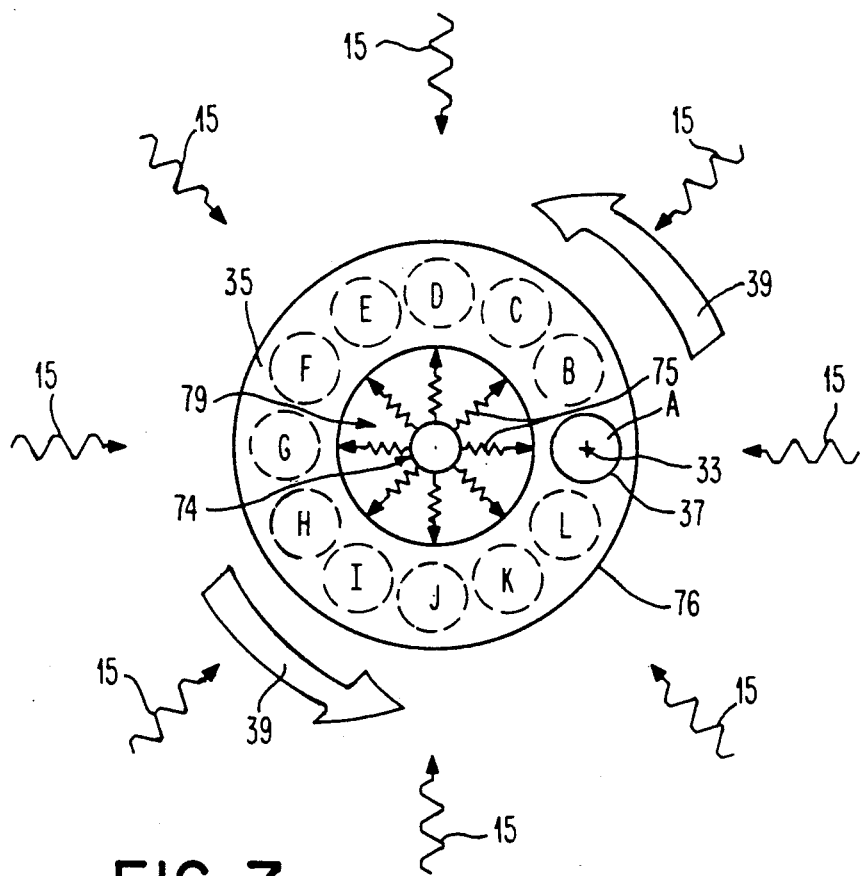
FIG. 7 illustrates another embodiment of this invention showing the hollow solid state lasing rod.

An alternate embodiment of the spinning laser rod is shown in FIG. 7. This embodiment discloses a hollow solid state laser rod 76, having at least one hollow region 79, which allows the addition of at least one pumping source 74, such as an arc lamp, providing pumping radiation 75, from the inside of the hollow laser rod 76. Additionally, the hollow region 79, can be cooled by pumping cooling fluid, such as water or other liquid or gas through it. This embodiment requires a rotary fluid coupling to allow cooling of the inside of the hollow laser rod 76, while allowing it to rotate. The outside of the hollow laser rod 76, can also be cooled and pumped as discussed and described earlier.

Furthermore, it was discovered that the spinning laser rod 36 or 76, provides more uniform temperature distribution in the laser rod, due to the fact that the entire laser rod is exposed uniformly to the illumination source. This spinning rod effectively homogenizes the pumping source, thereby reducing strain induced birefringence in materials, such as Ti:Sapphire or others.

Laser diode pumping or other pumping sources can also be used in place of the conventional arc lamp 14, or also in conjunction with the arc lamp 14.

The motor 46, could be an electric motor or a hydraulic motor or air driven gas motor or a turbine that is used to spin the laser rod. There could be other means to rotate the laser rod, such as by placing cups or paddles onto the laser rods and having the laser rod spin due to the movement of the cooling fluid. The laser rod could be direct driven as shown, or it could be an indirect drive using pulleys or gears setup to step up rotational speed of rod with respect to motor.

The bushing 66, could be made from porous or non-porous plastic or metal. Similarly, conventional ball bearings could also be used in place of the bushing 66. A pressurized fluid journal bearing would be an alternate method to replace the bushing 66. Similarly, air or gas bearings could also be used as high speed bearing instead of bushing 66.

By using pressurized cooling fluid 70, also as a bearing lubricant eliminates oil contamination inside laser cavity, because the cooling fluid 70, leaves the housing assembly 41, and does not allow oil or other contaminants to enter.

The flow of cooling fluid 70, from the elliptical reflector 12, to the external drip collection system 72, can be enhanced by providing microgrooves or microchannels on the outer surface of the bushing 66, or on the outer surface of the hollow shaft 64, or both, to control the flow of cooling/lubricating fluid 70, passing through to the external drip collection system 72, during operation.

While the present invention has been particularly described in conjunction with specific preferred embodiments, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present invention.

What is claimed is:

1. A CW pumped laser comprising:
   a) a laser rod for forming a laser beam, wherein said laser rod has an axis of rotation and a laser beam optical axis, wherein said optical axis is set-off from said axis of rotation by at least one laser beam radius,
   b) at least one means for optically pumping at least a portion of said laser rod,
   c) at least one means for rotating said laser rod,
   d) at least one first mirror to reflect at least a portion of said laser beam,
   e) at least one second mirror, wherein said second mirror is an output coupler mirror to reflect at least a portion of said laser beam, wherein said second mirror is opposite said first mirror, f) at least one aperture defining the diameter of said laser beam, and g) wherein said optical axis passes through said aperture and said first and said second mirrors during the rotation of said laser rod, thereby forming said CW pumped laser.

2. The CW pumped laser of claim 1, wherein said laser rod is a solid state laser rod.

3. The CW pumped laser of claim 1, wherein said at least one means for optically pumping said laser rod is at least one arc lamp.

4. The CW pumped laser of claim 1, wherein said at least one means for optically pumping said laser rod is at least one laser diode.

5. The CW pumped laser of claim 1, wherein said at least one means for optically pumping said laser rod further comprises a reflector.

6. The CW pumped laser of claim 1, wherein said laser rod comprises a lasing portion and a non-lasing portion, and wherein at least a portion of said non-lasing portion is continuously pumped by said at least one means for optically pumping said laser rod.

7. The CW pumped laser of claim 1, wherein said means of rotating said laser rod is an electric motor or a hydraulic motor or air driven gas motor or a turbine.

8. The CW pumped laser of claim 1, wherein at least one Q-switch controls the passage of said laser beam.

9. The CW pumped laser of claim 1, wherein said first mirror is an output coupler mirror.

10. The CW pumped laser of claim 1, wherein at least one means are provided to cool said laser rod and said at least one means for optically pumping said laser rod.

11. The CW pumped laser of claim 10, wherein said cooling means is a cooling fluid.

12. The CW pumped laser of claim 1, wherein said laser rod has at least one means for lubrication while said laser rod is rotating.

13. The CW pumped laser of claim 12, wherein said lubrication to said rotating laser rod is provided by at least one cooling fluid.

14. A CW pumped laser comprising:

a) a laser rod wherein at least a portion of said laser rod is hollow, and wherein at least a non-hollow portion of said hollow laser rod forms a laser beam, said hollow laser rod has an axis of rotation and a laser beam optical axis, wherein said optical axis is set-off from said axis of rotation by at least one laser beam radius, b) at least one means for optically pumping at least a portion of said hollow laser rod, c) at least one means for rotating said hollow laser rod, d) at least one first mirror to reflect at least a portion of said laser beam, e) at least one second mirror, wherein said second mirror is an output coupler mirror to reflect at least a portion of said laser beam, wherein said second mirror is opposite said first mirror, f) at least one aperture defining the diameter of said laser beam, and g) wherein said optical axis passes through said aperture and said first and said second mirrors during the rotation of said hollow laser rod, thereby forming said CW pumped laser.

15. The CW pumped laser of claim 14, wherein said hollow laser rod is a solid state laser rod.

16. The CW pumped laser of claim 14, wherein said at least one means for optically pumping said hollow laser rod is at least one arc lamp.

17. The CW pumped laser of claim 14, wherein said at least one means for optically pumping said hollow laser rod is at least one laser diode.

18. The CW pumped laser of claim 14, wherein said at least one means for optically pumping said hollow laser rod further comprises a reflector.

19. The CW pumped laser of claim 14, wherein said hollow laser rod comprises a lasing portion and a non-lasing portion, and wherein at least a portion of said non-lasing portion is continuously pumped by said at least one means for optically pumping said hollow laser rod.

20. The CW pumped laser of claim 14, wherein said means of rotating said hollow laser rod is an electric motor or a hydraulic motor or air driven gas motor or a turbine.

21. The CW pumped laser of claim 14, wherein at least one Q-switch controls the passage of said laser beam.

22. The CW pumped laser of claim 14, wherein said first mirror is an output coupler mirror.

23. The CW pumped laser of claim 14, wherein at least one means are provided to cool said hollow laser rod and said at least one means for optically pumping said hollow laser rod.

24. The CW pumped laser of claim 23, wherein said cooling means is cooling fluid.

25. The CW pumped laser of claim 14, wherein said hollow laser rod has at least one means for lubrication while said hollow laser rod is rotating.

26. The CW pumped laser of claim 25, wherein said lubrication to said rotating hollow laser rod is provided by at least one cooling fluid.

27. The CW pumped laser of claim 14, wherein at least a portion of said hollow laser rod is cooled from inside said hollow portion of said hollow laser rod or outside of said hollow laser rod or both.

28. The CW pumped laser of claim 14, wherein at least a portion of said hollow laser rod is optically pumped from inside said hollow portion of said hollow laser rod or outside of said hollow laser rod or both.

29. A method for an increased pulse repetition rate for a CW pumped laser comprising the steps of:

a) rotating a laser rod having an optical axis and a rotational axis, wherein said optical axis is displaced from said rotational axis by at least one radius of a laser beam, b) optically pumping at least a portion of said rotating laser rod, such that at least a portion of said rotating laser rod is lasing and forming said laser beam, while at least a portion of a non-lasing portion of said rotating laser rod is being optically pumped, c) at least two mirrors reflecting at least a portion of said laser beam, wherein at least one of said mirrors is an output coupler mirror, and d) allowing the passage of said reflected laser beam to pass through at least one exit aperture, and thereby increasing said pulse repetition rate for said CW pumped laser.

30. The method for CW pumped laser of claim 29, wherein said laser rod is a solid state laser rod.

31. The method for CW pumped laser of claim 29, wherein said at least one means for optically pumping said laser rod is at least one arc lamp.

32. The method for CW pumped laser of claim 29, wherein said at least one means for optically pumping said laser rod is at least one laser diode.

33. The method for CW pumped laser of claim 29, wherein said at least one means for optically pumping said laser rod further comprises a reflector.

34. The method for CW pumped laser of claim 29, wherein said means of rotating said laser rod is an electric motor or a hydraulic motor or air driven gas motor or a turbine.

35. The method for CW pumped laser of claim 29, wherein at least one Q-switch controls the passage of said laser beam.

36. The method for CW pumped laser of claim 29, wherein at least one means are provided to cool said laser rod and said at least one means for optically pumping said laser rod.

37. The method for CW pumped laser of claim 36, wherein said cooling means is a cooling fluid.

38. The method for CW pumped laser of claim 29, wherein said laser rod has at least one means for lubrication while said laser rod is rotating.

39. The method for CW pumped laser of claim 38, wherein said lubrication to said rotating laser rod is provided by at least one cooling fluid.

40. A method for an increase pulse repetition rate for a CW pumped laser comprising the steps of:
   a) rotating a laser rod, wherein at least a portion of said laser rod is hollow, said laser rod having an optical axis and a rotational axis, wherein said optical axis is displaced from said rotational axis by at least one radius of a laser beam,
   b) optically pumping at least a portion of said rotating hollow laser rod, such that at least a portion of said rotating hollow laser rod is lasing and forming said laser beam, while at least a portion of a non-lasing portion of said rotating laser rod is being optically pumped,
   c) at least two mirrors reflecting at least a portion of said laser beam, wherein at least one of said mirrors is an output coupler mirror, and
   d) allowing the passage of said reflected laser beam to pass through at least one exit aperture, and thereby increasing said pulse repetition rate for said CW pumped laser.

41. The method for CW pumped laser of claims 40, wherein said hollow laser rod is a solid state laser rod.

42. The method for CW pumped laser of claim 40, wherein said at least one means for optically pumping said hollow laser rod is at least one arc lamp.

43. The method for CW pumped laser of claim 40, wherein said at least one means for optically pumping said hollow laser rod is at least one laser diode.

44. The method for CW pumped laser of claim 40, wherein said at least one means for optically pumping said hollow laser rod further comprise a reflector.

45. The method for CW pumped laser of claim 40, wherein said means of rotating said hollow laser rod is an electric motor or a hydraulic motor or air driven gas motor or a turbine.

46. The method for CW pumped laser of claim 40, wherein a Q-switch controls the passage of said laser beam.

47. The method for CW pumped laser of claim 40, wherein at least one means are proved to cool said hollow laser rod and said at least one means for optically pumping said hollow laser rod.

48. The method for CW pumped laser of claim 47, wherein said cooling means is cooling fluid.

49. The method for CW pumped laser of claim 40, wherein said hollow laser rod has at least one means for lubrication while said hollow laser rod is rotating.

50. The method for CW pumped laser of claim 49, wherein said lubrication to said rotating hollow laser rod is provided by a cooling fluid.

51. The method for CW pumped laser of claim 40, wherein at least a portion of said hollow laser rod is cooled from inside said hollow portion of said hollow laser rod or outside of said hollow laser rod or both.

52. The method for CW pumped laser of claim 40, wherein at least a portion of said hollow laser rod is optically pumped from inside said hollow portion of said hollow laser rod or outside of said hollow laser rod or both.

* * * * *